July 2, 1929.  T. D. COLLINS  1,719,591
FISH BOX
Filed May 4, 1923  2 Sheets-Sheet 1
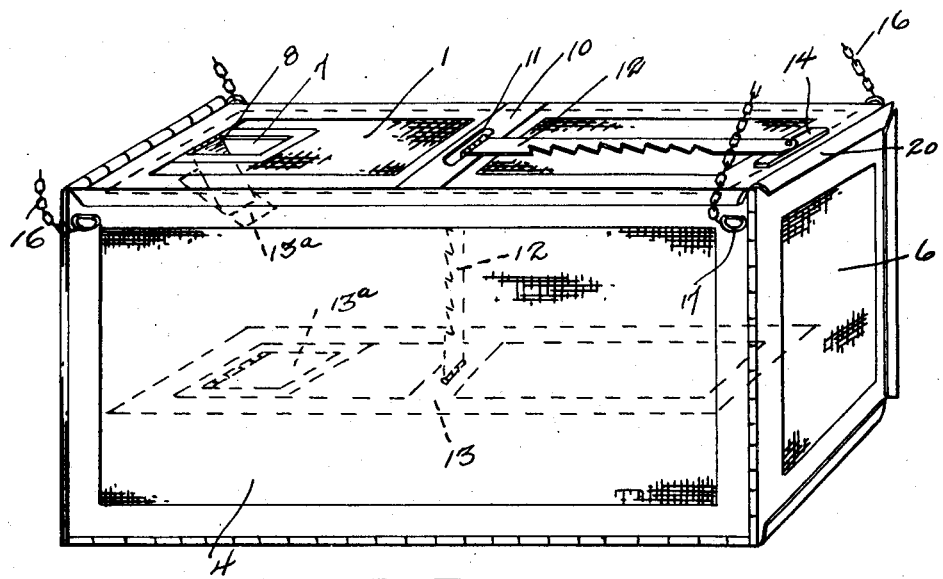
FIG-1-
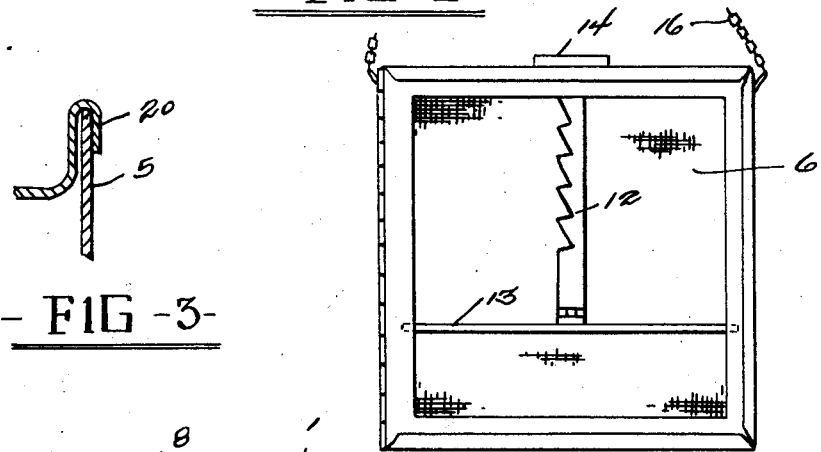
FIG-3-
FIG-2-
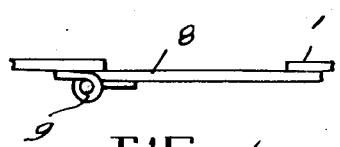
FIG-6-
INVENTOR.
Thomas D. Collins
BY
ATTORNEY.

July 2, 1929.  T. D. COLLINS  1,719,591
FISH BOX
Filed May 4, 1928  2 Sheets-Sheet 2
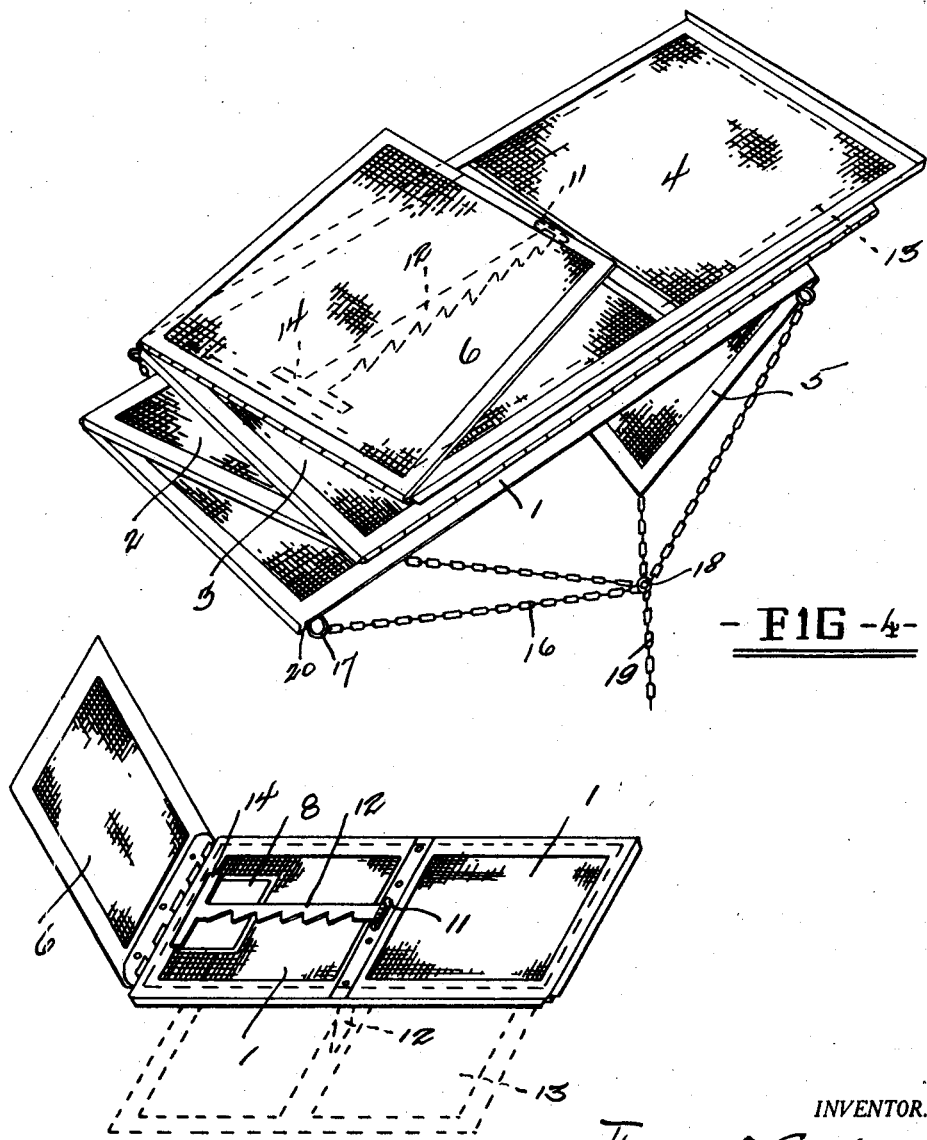
FIG-4-
FIG-5-
INVENTOR.
Thomas D. Collins
BY
ATTORNEY.

Patented July 2, 1929.

1,719,591

UNITED STATES PATENT OFFICE.

THOMAS D. COLLINS, OF WASHINGTON, DISTRICT OF COLUMBIA.

FISH BOX.

Application filed May 4, 1928. Serial No. 275,033.

This invention relates to fish boxes, constituting a collapsible box all the sides being made of small mesh wire fabric. Devices of this type are used to keep fish in, after they have been caught, and thus enable them to be kept alive much longer than otherwise. The device is placed in the water and as fish are caught they are inserted into the box, and thus are kept in the water and will stay alive for a much longer time than they would if they were allowed to lie in the bottom of a boat or otherwise out of water.

An object of the invention is to provide means by which the box may be readily and easily set up into position to receive the fish.

Another object resides in the sides and ends of the box being hinged so that it can easily be collapsed or folded into a compact form so that it can easily be carried from place to place and require little room. It can also be readily assembled or put up in a very few minutes in the position to receive the fish.

Another feature consists of a "pacifier" or false top which may be let down on the fish to prevent them from thrashing around or leaping and perhaps injuring or killing themselves while confined in the box.

Other objects and advantages will be seen from the following description.

In the drawings Fig. 1 is a perspective of the box or cage set up. Fig. 2 is an end view. Fig. 3 is a detail of an edge joint. Fig. 4 is a perspective of the device partly collapsed. Fig. 5 is a perspective of the top of the box and parts associated therewith. Fig. 6 is a detail of a door.

The top of the box or cage is designated by the numeral 1. The sides by the numerals 2 and 4, the bottom by 3 and the ends by 5 and 6. The top 1 has an opening 7 through which the fish are inserted. This opening is closed by an inwardly opening door 8 which is kept closed by the action of a spring hinge 9 which tends at all times to force the door outwardly against its frame. Thus the fish are inserted by simply pushing down on the door 8, after which it is automatically closed by the spring 9. Midway of the top and extending crosswise of it is a narrow metal strip 10 having a slot 11 through which a notched bar 12 slides to raise or lower the false top 13. The notched bar is hinged at its lower end to the false top. Thus when the false top is in its raised position it may be held adjacent the top 1 by folding the bar down upon the said top. The upper end of the bar 12 has a cross handle 14 of metal which supports the false top a few inches from the bottom when it is let down and also limits the downward movement of the bar 12. This false top 13 also has an inwardly opening spring pressed door 13ᵃ which registers with the door 8 of the top 1.

The means for carrying and suspending the device while in its set up position consists of chains 16 which are fastened by snap fasteners to the rings 17 there being four such rings fastened to the four upper corners of the two sides 2 and 4. The four chains 16 are of equal length and converge and are held together at their ends by a ring 18. To this ring 18 is connected another chain 19 facilitating the lowering of the box down into the water to a desirable depth.

The edges of the top, bottom and sides are bent to form grooves 20 which receive the edges of the ends 5 and 6 when in its set up position thus forming a neat and rigid structure. The top, bottom and sides are hinged to each other in a line and the ends 5 and 6 are hinged to opposite side edges of the top 1 and side 4.

In setting up the box the side 4 is folded up to vertical position and the end 6 is folded in to engage in the grooves 20 at one end of the bottom 3. The side 2 and top 1 are then swung up to vertical and top positions respectively and the end 5 is swung in to close the end of the box, the meeting edges being engaged by the grooves 20 as they come together. This supports the false top 13 in position to be lowered when desired. The box may be knocked down or collapsed by the reverse operation. Ordinarily, when the box is down into the water the fish will remain quiet, but when the box is lifted out of the water, especially if large fish are confined therein, it is desirable to let down the false top until it contacts with the fish as indicated in dotted lines in Fig. 1, in which position it will press against the fish and hold them against the bottom of the box, preventing them from flopping or jumping and so injuring or killing themselves. When the box is again lowered into the water the false top can be pulled up, and the bar 12 swung down upon the top of the box in which position it will support the false top in the upper part of the box.

The device will also be found quite useful in transporting fish by letting the false top down upon the fish, if desired, and then filling the space above with cracked ice.

I claim:

1. A folding box comprising top, bottom and side sections hinged together in series, and ends hinged to opposite ends respectively of the top and one of the sides of the series, some of the edges of some of the sections having grooves in which other edges of the sections are engaged when the box is set up.

2. A box for fish or the like, having a false top adjustable up and down in the box, to confine fish to the bottom when desired, and an inwardly swinging door in the false top.

3. A box for fish or the like, having a false top adjustable up and down therein, and an operating bar hinged to the false top and working through an opening in the top wall of the box and foldable down upon the outside thereof.

4. A folding box for fish or the like, comprising top, bottom, side and end sections hinged together and foldable upon each other, and a false inner top having an operating bar hinged thereto and working through an opening in the top section to raise or lower said false top when the box is set up, the bar being foldable down upon the top section when the box is collapsed.

5. A box as set forth in claim 3, the bar being notched to engage the edge of the opening and hold the false top in adjusted position.

6. A box as set forth in claim 3, the top of the box having an inwardly opening door therein, and the false top having also an inwardly opening door registering with said door, whereby a fish may be inserted through both doors.

In testimony whereof, I affix my signature.

THOMAS D. COLLINS.